US007354066B2

(12) United States Patent
Yamamoto

(10) Patent No.: US 7,354,066 B2
(45) Date of Patent: Apr. 8, 2008

(54) COUNTERWEIGHT DEVICE FOR CONSTRUCTION MACHINERY

(75) Inventor: Kazunori Yamamoto, Tsuchiura (JP)

(73) Assignee: Hitachi Sumitomo Heavy Industries Construction Crane Co., Ltd., Tokyo (JP)

( * ) Notice: Subject to any disclaimer, the term of this patent is extended or adjusted under 35 U.S.C. 154(b) by 282 days.

(21) Appl. No.: 11/175,283

(22) Filed: Jul. 7, 2005

(65) Prior Publication Data

US 2006/0103125 A1 May 18, 2006

(30) Foreign Application Priority Data

Jul. 7, 2004 (JP) ............................. 2004-200346

(51) Int. Cl.
*B62D 49/08* (2006.01)

(52) U.S. Cl. ....................................... 280/759; 280/760

(58) Field of Classification Search ................ 280/758, 280/759, 760, 757
See application file for complete search history.

(56) References Cited

U.S. PATENT DOCUMENTS

| | | | | |
|---|---|---|---|---|
| 3,902,735 | A * | 9/1975 | Bertram et al. | 280/759 |
| 5,088,882 | A * | 2/1992 | Lovitt, Jr. | 414/723 |
| 5,332,353 | A * | 7/1994 | Arnold | 414/723 |
| 5,462,309 | A * | 10/1995 | Jeffers et al. | 280/759 |
| 6,471,245 | B1 * | 10/2002 | Schott | 280/759 |
| 6,533,319 | B1 * | 3/2003 | Denby et al. | 280/759 |
| 6,988,560 | B2 * | 1/2006 | Bay | 172/272 |
| 7,168,740 | B2 * | 1/2007 | Kobayashi et al. | 280/759 |
| 2003/0222447 | A1 * | 12/2003 | Powell | 280/759 |

FOREIGN PATENT DOCUMENTS

| | | |
|---|---|---|
| JP | 10-195927 A | 7/1998 |
| JP | 11-200421 A | 7/1999 |
| JP | 2000-072383 | 3/2000 |
| JP | 2002-194774 | 7/2002 |

OTHER PUBLICATIONS

Chinese Office Action dated Dec. 8, 2006 including English translation (fourteen (14) pages).

* cited by examiner

*Primary Examiner*—Eric Culbreth
*Assistant Examiner*—Joseph Rocca
(74) *Attorney, Agent, or Firm*—Crowell & Moring LLP

(57) ABSTRACT

A counterweight device comprises a first engaging groove formed at a counterweight, a second engaging groove formed at a body frame, a first engaging member projecting at the counterweight, which engages at the second engaging groove when mounting the counterweight, a second engaging member projecting at the body frame, which engages at the first engaging groove when mounting the counterweight. A locking device that locks the counterweight to the body frame when the first engaging member is engaged at the second engaging groove and the second engaging member is engaged at the first engaging groove.

6 Claims, 12 Drawing Sheets

RIGHT
REAR
FRONT
LEFT
10
SW
37
25
29
28
26
27
V
20
23
22
25a
21
24
1

COUNTERWEIGHT DEVICE FOR CONSTRUCTION MACHINERY

INCORPORATION BY REFERENCE

The disclosure of the following priority application is herein incorporated by reference: Japanese Patent Application No. 2004-200346 filed Jul. 7, 2004

BACKGROUND OF THE INVENTION

1. Field of the Invention

The present invention relates to a counterweight device for a construction machine, which detachably mounts a counterweight at a body frame.

2. Description of Related Art

A counterweight is mounted at the rear end of the body frame of a construction machine such as a crawler crane so as to achieve balanced weight distribution during operations. When the crawler crane is transported on a trailer, the counterweight may need to be disengaged from the crawler crane due to restrictions such as the maximum load capacity of the trailer and, in such a case, a counterweight detaching operation must be performed. Japanese Laid Open Patent Publication No. 2000-72383 discloses a counterweight device used in attaching/detaching operations, which includes a pin projecting at a side surface of the counterweight to be engaged at an engaging groove at the body frame. After the pin is engaged at the engaging groove, the counterweight is made to swing along the forward/rearward direction with the pin working as the fulcrum, a spacer is inserted between the front surface of the counterweight and the rear end surface of the body frame and the attitude of the mounted counterweight (e.g., the gap between the counterweight and the body frame) is adjusted.

However, the counterweight device disclosed in the publication mentioned above necessitates the adjustment of the counterweight mounting attitude by inserting a spacer between the counterweight and the body frame when mounting the counterweight, making the mounting operation a laborious process.

SUMMARY OF THE INVENTION

A counterweight device for a construction machine, utilized to mount a counterweight at a body frame of the construction machine according to a first aspect of the present invention includes a first engaging groove formed at the counterweight, a second engaging groove formed at the body frame, a first engaging member projecting from the counterweight, that engages at the second engaging groove when mounting the counterweight, a second engaging member projecting from the body frame, that engages at the first engaging groove when mounting the counterweight, and a locking device that locks the counterweight to the body frame when the first engaging member is engaged at the second engaging groove and the second engaging member is engaged at the first engaging groove.

In the counterweight device for a construction machine according to the first aspect of the present invention, it is desirable that the first engaging groove is formed above the first engaging member so as to have an open top, and the second engaging groove is formed below the second engaging member to have an open bottom. In the counterweight device for a construction machine according the first aspect of the present invention, the first engaging groove may be formed below the first engaging member so as to have an open bottom, and the second engaging groove may be formed above the second engaging member to have an open top.

In the counterweight device for a construction machine according to the first aspect of the present invention, an elevating device that raises/lowers the counterweight relative to the body frame may be further provided. In the counterweight device for a construction machine according to the first aspect of the present invention, the first engaging groove and the second engaging groove may be each formed so that a width of the groove becomes gradually smaller toward an innermost area of the groove relative to the width at an entry area thereof.

A counterweight device for a construction machine, utilized to mount a counterweight at a body frame of the construction machine according to a second aspect of the present invention, includes a hydraulic cylinder that raises/lowers the counterweight relative to the body frame, with the hydraulic cylinder being a trunnion-mounted hydraulic cylinder at which a connecting unit for mounting the hydraulic cylinder at the counterweight is provided at side surface thereof.

In the counterweight device for a construction machine according to the second aspect of the present invention, it is preferable that the connecting unit is a pin projecting from a cylinder tube of the hydraulic cylinder, and the counterweight comprises a supporting member including a longitudinal hole for receiving the pin, that supports the hydraulic cylinder. In the counterweight device for a construction machine according to the second aspect of the present invention, a first engaging groove formed at the counterweight, a second engaging groove formed at the body frame, a first engaging member projecting from the counterweight, that engages at the second engaging groove when mounting the counterweight, a second engaging member projecting from the body frame, that engages at the first engaging groove when mounting the counterweight, and a locking device that locks the counterweight to the body frame when the first engaging member is engaged at the second engaging groove and the second engaging member is engaged at the first engaging groove may be further provided.

A counterweight device for a construction machine, utilized to mount a counterweight at a body frame of the construction machine according to a third aspect of the present invention, includes a hydraulic cylinder that raises/lowers the counterweight relative to the body frame, with a mounting position at which the hydraulic cylinder being mounted at the counterweight is positioned above a position of the center of gravity of the counterweight.

In the counterweight device for a construction machine according to the third aspect of the present invention, a first engaging groove formed at the counterweight, a second engaging groove formed at the body frame, a first engaging member projecting from the counterweight, that engages at the second engaging groove when mounting the counterweight, a second engaging member projecting from the body frame, that engages at the first engaging groove when mounting the counterweight, and a locking device that locks the counterweight to the body frame when the first engaging member is engaged at the second engaging groove and the second engaging member is engaged at the first engaging groove may be further provided.

DESCRIPTION OF PREFERRED EMBODIMENTS

First Embodiment

The following is an explanation of a first embodiment of a counterweight device according to the present invention given in reference to FIGS. 1 through 8.

Figure 1:
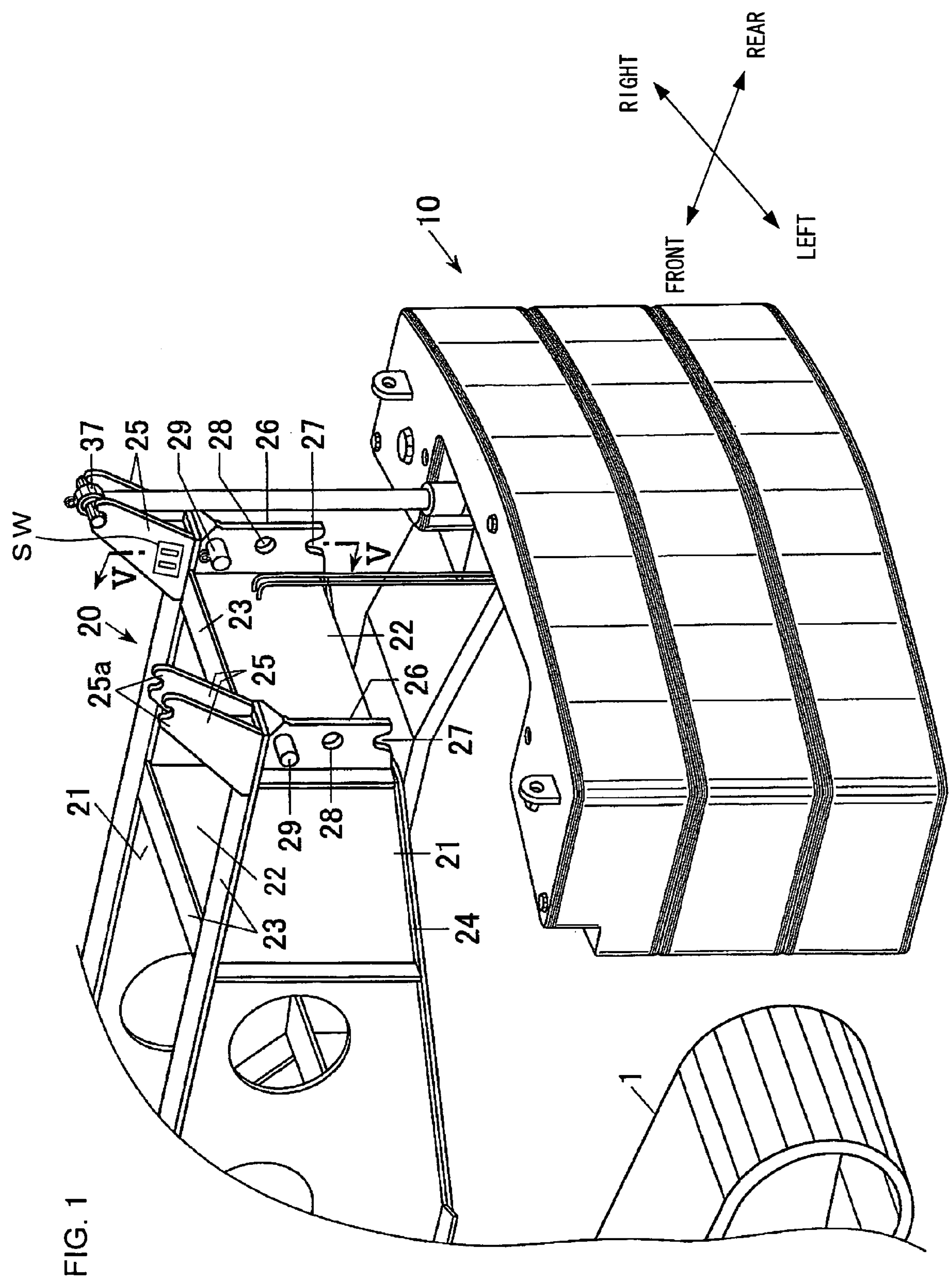
FIG. 1 is a perspective showing the structure adopted in a counterweight device in a first embodiment of the present invention.
Figure 2:
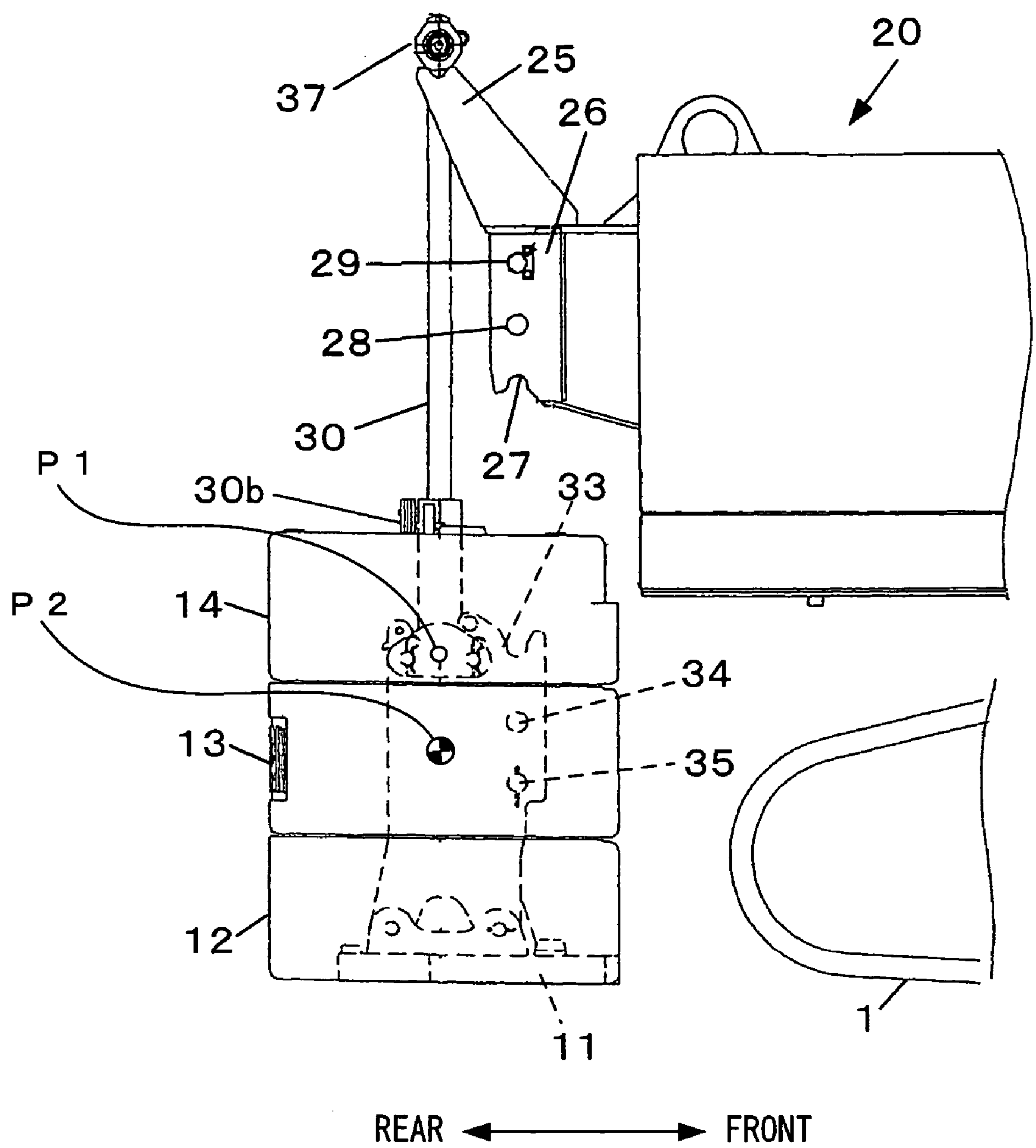
FIG. 2 is a side elevation of FIG. 1.
Figure 3:
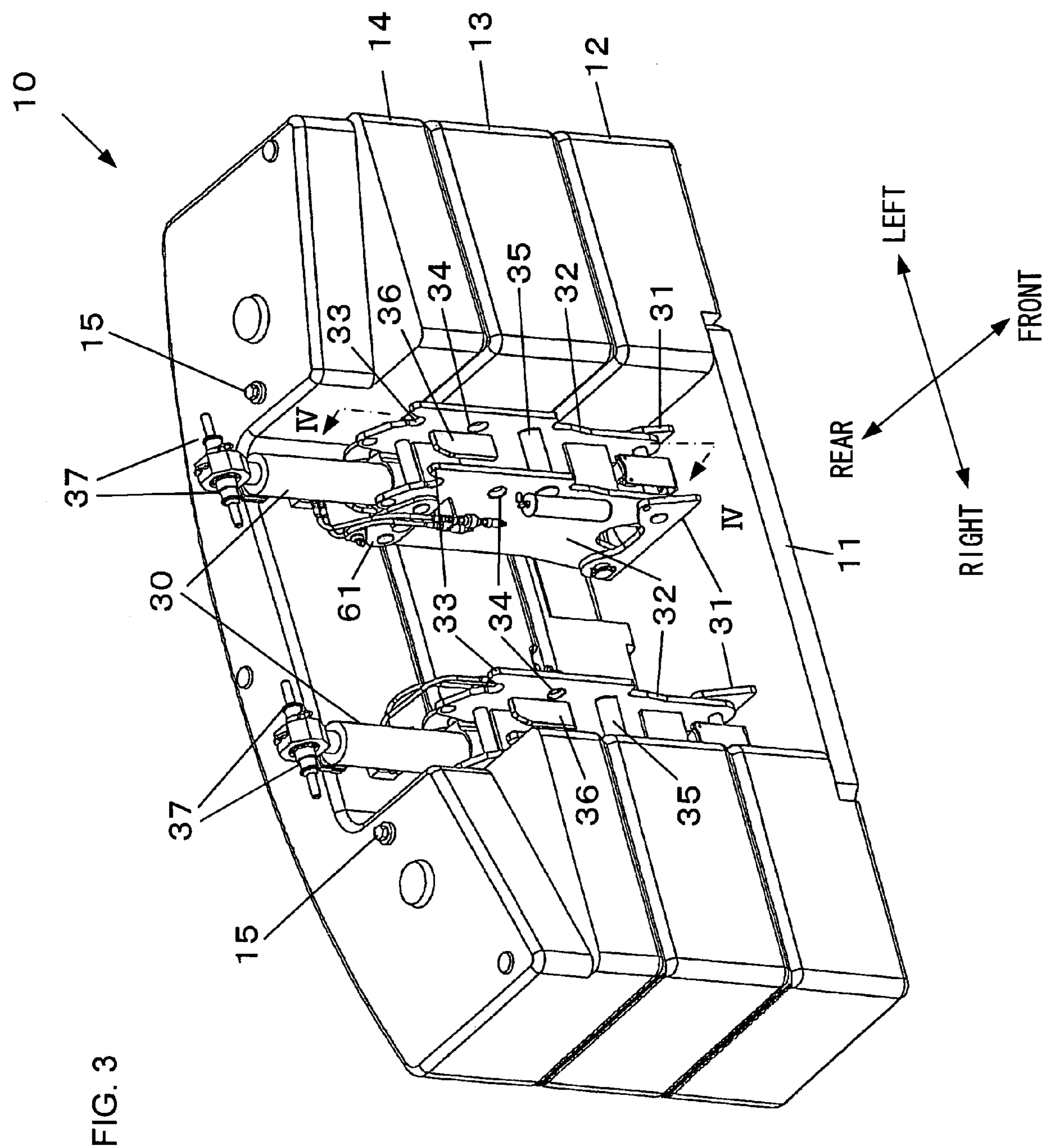
FIG. 3 is a perspective of the counterweight in FIG. 1, viewed from the front.

In the perspective in FIG. 1 showing a structure of the counterweight device achieved in the first embodiment, a counterweight 10 is yet to be mounted at the rear end of a body frame 20. FIG. 2 is a side elevation of FIG. 1 and FIG. 3 is a perspective of the counterweight 10, viewed from the front side of a vehicle. In the example presented in FIG. 1, the counterweight 10 is to be mounted at a crawler crane. The body frame 20 of the crawler crane is rotatably disposed at a traveling body 1, with a work device that includes, e.g., a boom, an arm, a bucket and the like (not shown) mounted at the front of the body frame 20.

As shown in FIG. 3, the counterweight 10 is constituted by stacking weights 13 and 14 on a weight 12 to which a baseplate 11 is fixed and the individual weights 12 to 14 are fastened together through bolts 15. The weights 12 through 14 are each formed roughly in a U-shape viewed from above, and a pair of hydraulic cylinders 30, i.e., a left hydraulic cylinder and a right hydraulic cylinder, which are used when mounting/dismounting the counterweight, are disposed in the space enclosed by the U-shaped weights. A cylinder tube of each hydraulic cylinder 30 is disposed between a pair of support plates 32, i.e., a left support plate and a right support plate, set upright on the base plate 11 via brackets 31, and is supported by the support plates 32. The support plates 32 should be understood as a supporting member that supports the hydraulic cylinders 30.

A piston rod of each hydraulic cylinder 30 extends upward relative to the cylinder tube. A rod pin 37 is mounted at the upper end of each piston rod, and the rod pin 37 projects to the left and right of the piston rod. It is to be noted that the pair of support plates 32 and 32, i.e., the left support plate and the right support plate, are linked with each other via a reinforcing member or the like so as to constitute an integrated box structure.

Further frontward relative to each hydraulic cylinder 30, guide grooves 33 each opening upward and recessed downward along the vertical direction are formed at the upper end surfaces of the support plates 32, as shown in FIGS. 2 and 3. The inner surfaces (bottom surfaces) of the guide grooves 33 assume a circular arc contour to match the shape of guide pins 29 at the body frame 20 to be detailed later. The guide grooves 33 are each formed to taper from the entry area toward the innermost area, and the width of the guide grooves 33 taken along the forward/rearward direction is the largest at the entry area. Below each guide groove 33, a pinhole 34, at which a pin 40 (see FIG. 8) used to mount the counter weight is inserted, is formed.

Figure 4:
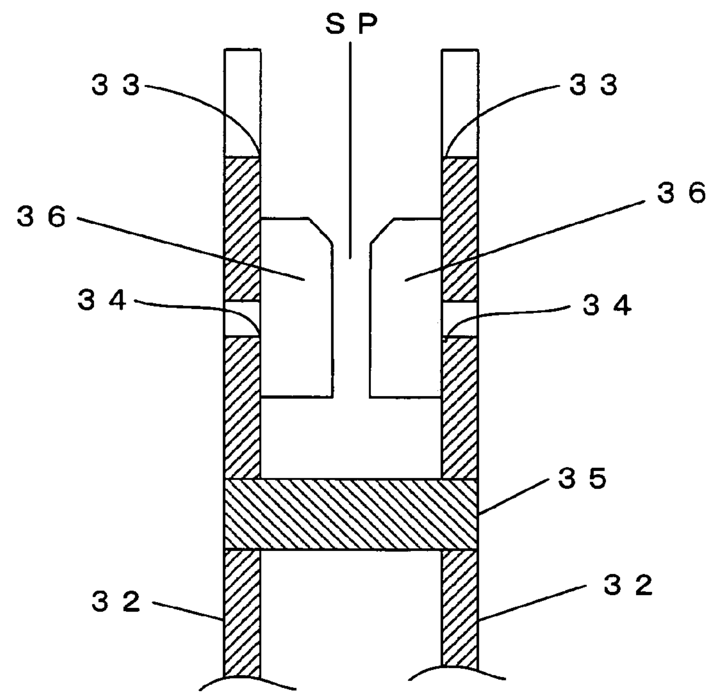
FIG. 4 is a sectional view taken along line IV-IV in FIG. 3.

As shown in the sectional view in FIG. 4, taken along line IV-IV in FIG. 3, a guide pin 35 is disposed below the pinholes 34 so as to extend along the horizontal direction bridging between each pair of left and right support plates 32. Guides 36 are fixed to the inner side surfaces of the support plates 32 further rearward relative to the pinholes 34 so as to face opposite each other, and a gap SP ranging along the vertical direction is formed between the guides 36. The guide grooves 33, the pinholes 34, the guide pin 35 and the like at the support plates 32 are formed with a high level of precision through machining.

As shown in FIG. 1, the body frame 20 includes a pair of main plates 21, i.e., a left main plate and a right main plate, each extending along the frontward/rearward direction, lateral plates 22 ranging to the left and the right to bridge the main plates 21, top plates 23 fixed onto the upper end surfaces of the main plates 21 and the lateral plates 22 and bottom plate 24 fixed onto the lower end surfaces of the main plates 21 and the lateral plates 22. On the upper surface at the rear end of each of the left and right upper plates 23, a pair of brackets 25, i.e., a left bracket and a right bracket, extend rearward, with a notch 25*a* used to support the rod pin 37 formed at the upper end surface of each bracket 25 at a position further rearward relative to the rear end surface of the top plate 23.

A bracket 26 is disposed at the rear end of each of the left and right main plates 21. At the lower end surface of the bracket 26, a guide groove 27 having an open bottom and recessed upward along the vertical direction is formed. The inner surface (the top surface) of the guide groove 27 assumes a circular arc contour to match the shape of the guide pin of the counterweight 10 mentioned earlier. The guide groove 27 is formed so as to taper from the entry area toward the innermost area, and the width of the guide groove 27 along the forward/rearward direction is the largest at the entry area. Above the guide groove 27, a pinhole 28 at which a pin (see FIG. 8) used to mount the counterweight is inserted, is formed.

Figure 5:
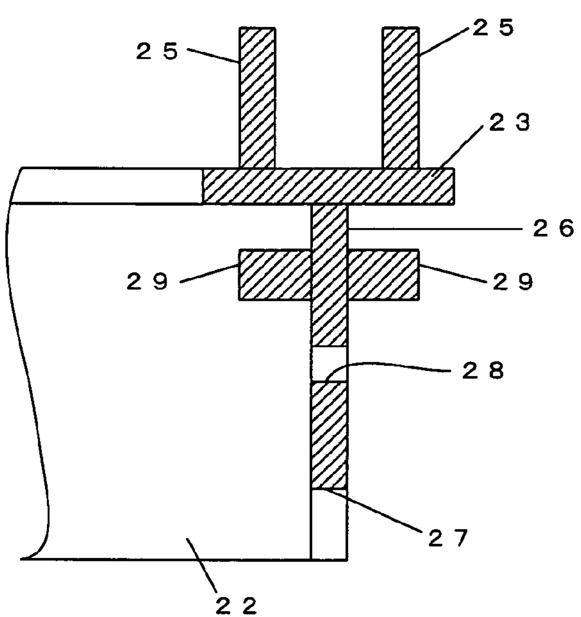
FIG. 5 is a sectional view taken along line V-V in FIG. 1.

As shown in FIG. 5 in a sectional view taken along line V-V in FIG. 1, guide pins 29, one projecting to the left and the other projecting to the right are disposed above the pinhole 28 at the bracket 26. The guide pins 29, the pinhole 28 and the guide groove 27 formed respectively in correspondence to the guide grooves 33, the pinholes 34 and the guide pin 35 at the counterweight 10. The guide groove 27, the pinhole 28, the guide pins 29 and the like at the bracket 26 are formed with precision through machining.

Figure 6A:
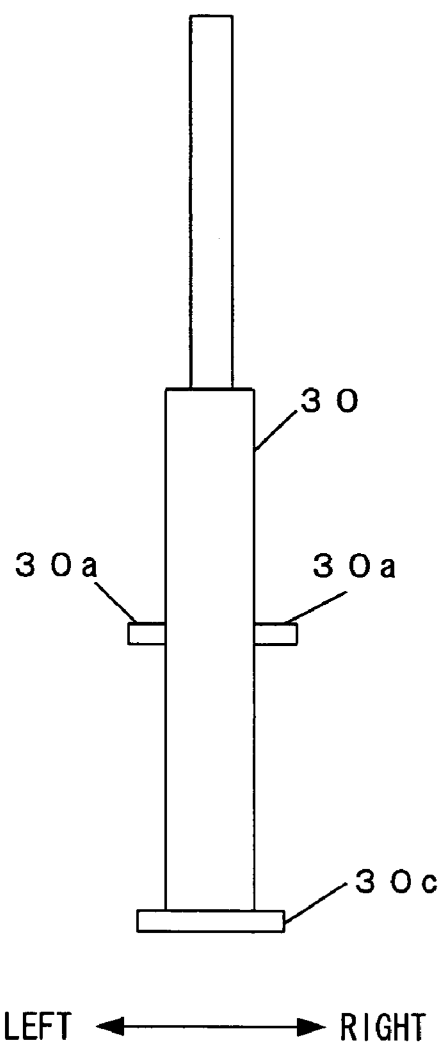
FIGS. 6A and 6B show a hydraulic cylinder mounting structure.

Now, the mounting structure adopted when mounting the hydraulic cylinders 30 is explained in detail. As shown in FIG. 6A, a pair of pins 30*a*, one projecting to the left and the other projecting to the right, are disposed at a middle point along the vertical direction at the cylinder tube of each hydraulic cylinder 30. Namely, each hydraulic cylinder 30 is formed to be a trunnion-mounted hydraulic cylinder at which the pins 30*a* are disposed at the side surfaces of the cylinder tube so as the hydraulic cylinder to be fixed to the supporting plates 32 with the pins 30*a* working as a connecting unit. By adopting a trunnion mount, the minimum length of the hydraulic cylinder 30 can be shortened and as a result, the overall height of the counterweight device can be set low.

In addition, as shown in FIG. 2, a mounting point P1 of the hydraulic cylinder 30, i.e., the pin 30*a* is positioned above a position P2 of the center of gravity of the counterweight 10 constituted of the weights 12 to 14. Accordingly, when raising/lowering the counterweight 10 by the hydraulic cylinders 30, the vertical force alone acts on the hydraulic cylinders 30, which makes it possible to achieve a simple and light structure. If the position P2 of the center of gravity was positioned above the mounting point P1, on the other hand, the counterweight 10 would tend to swing around the pins 30*a* and it would be necessary to install a swing prevention mechanism or the like, causing the structure to be complex.

Figure 6B:
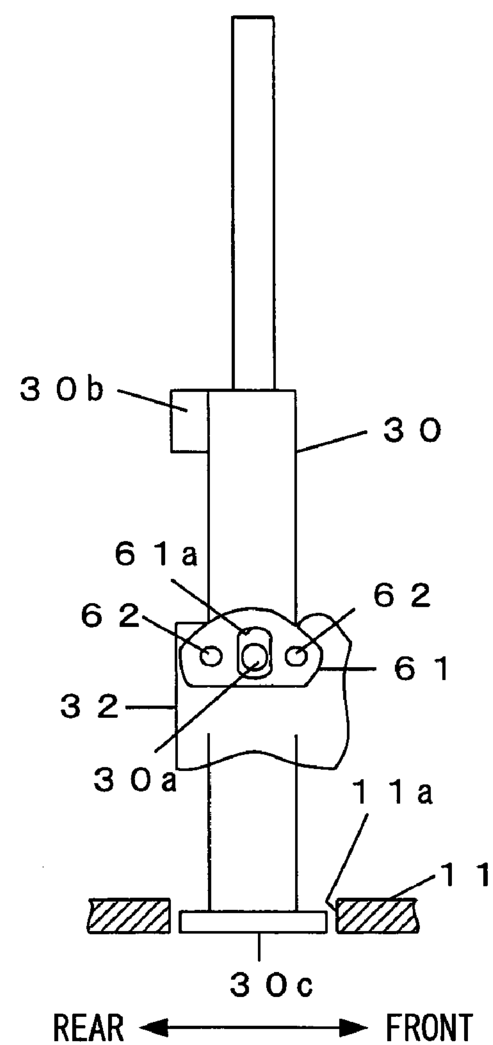
Figure 7:
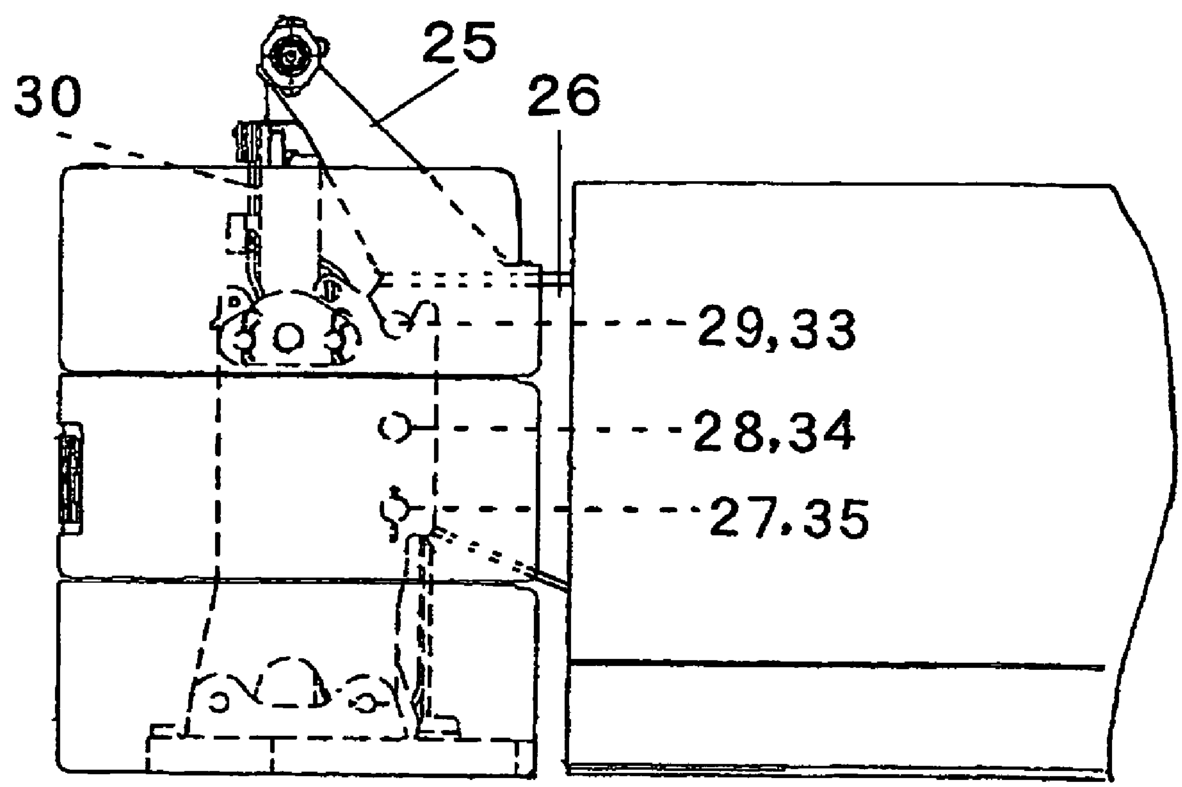
FIG. 7 shows a counterweight mounting procedure (1) executed with the counterweight device achieved in the first embodiment.
Figure 7:
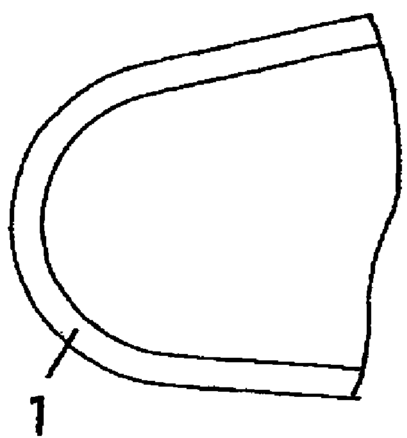

As shown in FIG. 6B, a substantially triangular mounting plate 61 (see FIG. 3) is mounted via pins 62 at the upper end of each support plate 32. A pin 30*a* at the cylinder tube is inserted into a through hole 61*a* at the center of the mounting plate 61, so as to support the hydraulic cylinder 30 while allowing it to swing forward/backward. The through hole 61*a* is a longitudinal hole elongated along the vertical direction and the hydraulic cylinder 30 is allowed to swing to the left and the right as well via the longitudinal hole.

A plumb bob 30*b* (see FIG. 2) is mounted at the rear surface of the cylinder tube of the hydraulic cylinder 30 at the upper end thereof. Thus, as the piston rod is extended upward, the center of gravity of the hydraulic cylinder 30 is displaced upward relative to the pins 30*a*, causing the upper portion of the hydraulic cylinder 32 swing backward with the fulcrum of the motion at the pins 30*a*. As a result, the piston rod is allowed to extend without the piston rod and the brackets 25 on the body frame side interfering with each other. After the piston rod extends with the brackets 25 out of its way, the upper portion of the hydraulic cylinder 3*b* is caused to swing forward so as to engage the rod pins 37 located at the tip of the piston rod with the notches 25*a* at the upper end surfaces of the brackets 25. Through this procedure, the rod pins 37 can be engaged in the notches 25*a* with ease even when the brackets 25 are positioned above the hydraulic cylinder 30.

Since the hydraulic cylinder 30 is allowed to swing to the left and the right, the rod pins 37 can be engaged in the notches 25*a* by absorbing any assembly errors or the like that may exist with regard to the assembly of the individual parts. It is to be noted that a stopper 30*c* is disposed at the bottom end of the cylinder tube, and the stopper 30*c* is housed inside an opening 11*a* at the base plate 11. Thus, as the hydraulic cylinder 30 rocks, the end surface of the stopper 30*c* comes in contact with the edge of the opening 11*a* to regulate the extent to which the hydraulic cylinder 30 is allowed to rock.

Next, the procedure for mounting the counterweight 10 is explained.

First, the counterweight 10 is formed as a preassembled integrated unit which includes the base plate 11 and the weights 12 to 14, and the counterweight 10 is then placed at a position below and to the rear of the body frame 20, as shown in FIG. 2. Next, through switch operations at a counterweight attaching/detaching switch SW (see FIG. 1), the hydraulic cylinders 30 are driven with a dedicated hydraulic source unit (not shown) or a hydraulic source unit installed at the crawler crane so as to extend the piston rods upward and to engage the rod pins 37 at the notches 25*a* of the brackets 25, as shown in the figure. In this state, the hydraulic cylinders 30 are caused to slowly retract, thereby raising the counterweight 10. At this time, the brackets 26 enter the gaps SP between the guides 36 as shown in FIG. 4 and thus, the counterweight 10 moves upward while its horizontal position is regulated with the guides 36.

When the counterweight 10 is raised to a specific extent, the guide pins 29 at the body frame 20 (the brackets 26) move into the guide grooves 33 at the counterweight 10 (the support plates 32). Also, the guide pins 35 at the counterweight 10 move into the guide grooves 27 at the body frame 20. Thus, the grooves 33 and the guide pins 35 at the counterweight 10 are guided respectively by the guide pins 29 and the guide grooves 27 at the body frame 20 while controlling the swinging motion of the counterweight 10 along the forward/rearward direction thereby correcting the attitude at which the counterweight 10 is mounted.

Figure 8:
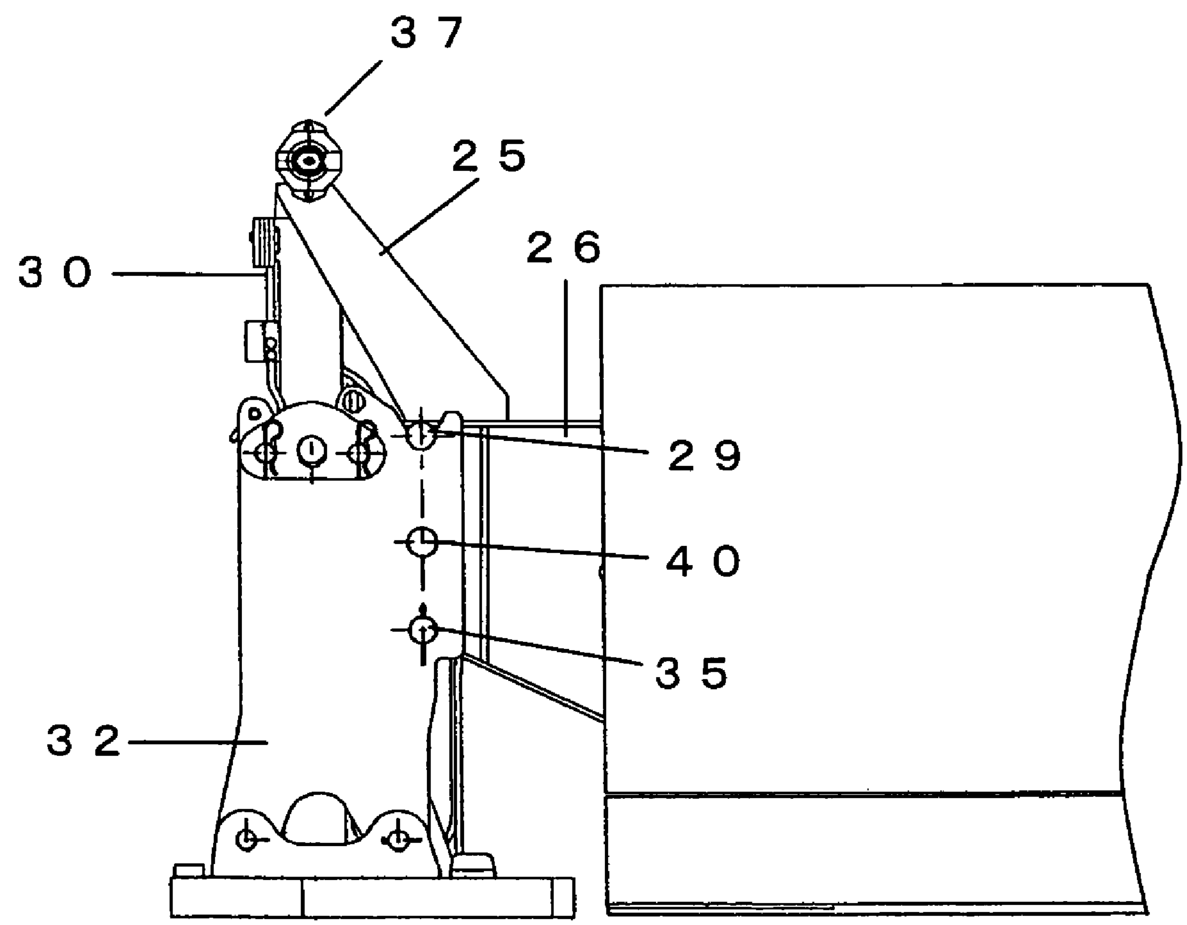
FIG. 8 shows a counterweight mounting procedure (2) executed with the counterweight device achieved in the first embodiment.
Figure 8:
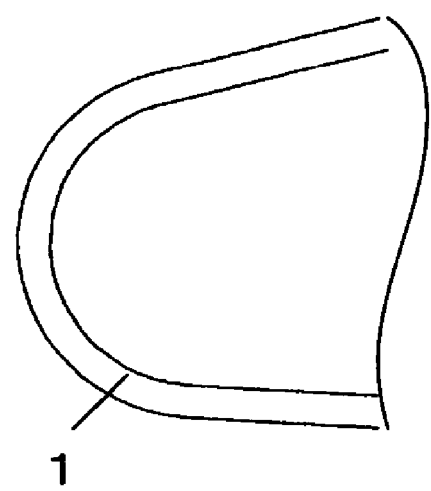

As the guide pins 29 and 35 reach the innermost areas of the guide grooves 33 and 27, the retracting movement of the hydraulic cylinders 30 stops. At this time, the counterweight 10 is held in position at two points along the vertical direction relative to the body frame 20 in a state in which the pinholes 28 at the body frame 20 and the pinholes 34 at the counterweight 10 are aligned. In this state, the pins 40 are inserted sideways into the pinholes 28 and 34 along the horizontal direction, as shown in FIG. 8. Through this process, the counterweight 10 becomes locked to the body frame 20, and the mounting procedure for mounting the counterweight 10 is completed. It is to be noted that the counterweight 10 can be dismounted by reversing the mounting procedure.

The following operational advantages can be achieved in the first embodiment described above.

(1) The guide pin 35 is disposed to extend along the horizontal direction between each pair of support plates 32 at the counterweight 10, the guide pins 29, one projecting to the left and the other projecting to the right, are disposed at each bracket 26 at the rear end of the body frame 20, and the guide groove 27 and the guide grooves 33 are respectively formed at the lower end surface of the bracket 26 and the upper end surfaces of the support plates 32 in correspondence to the guide pin 35 and the guide pins 29. Thus, as the hydraulic cylinder 30 is caused to retract, the guide pins 35 and the guide grooves 33 at the counterweight 10 are guided along the guide grooves 27 and the guide pins 29 at the body frame 20 to raise the counterweight 10 and align the positions of the pinholes 34 and 28. Since this eliminates the need to adjust the mounting attitude of the counterweight 10 by using spacers or the like, the procedure for mounting the counterweight 10 is facilitated.

(2) With the hydraulic cylinders 30, self-actuated mounting/dismounting of the counterweight 10 is enabled, and since it is not necessary to specially procure a crane or the like to be used to hoist the counterweight 10, the procedure for mounting the counterweight 10 is facilitated.

(3) Since the guide grooves 27 and 33 are formed to recess upward and downward respectively, the direction along which the counterweight 10 is moved by the hydraulic cylinders 30 and the direction along which the guide grooves 27 and 33 are recessed are made to substantially match. This means that the counterweight 10 can be elevated and lowered smoothly without placing an excessive load on the guide pins 29 and 35.

(4) Since the tapered guide grooves 27 and 33 are formed along the forward/rearward direction by ensuring that the width of each of the guide grooves 27 and 33 are the largest at the entry area. As a result, the mounting attitude of the counterweight 10 can be modified with ease as the counterweight 10 moves upward.

(5) Since each bracket 26 enters the gap SP formed between the guides 36 each disposed at the inner surface of the support plate 32, the counterweight 10 can be positioned with ease along the horizontal direction relative to the body frame 20, as well.

Second Embodiment

Figure 9:
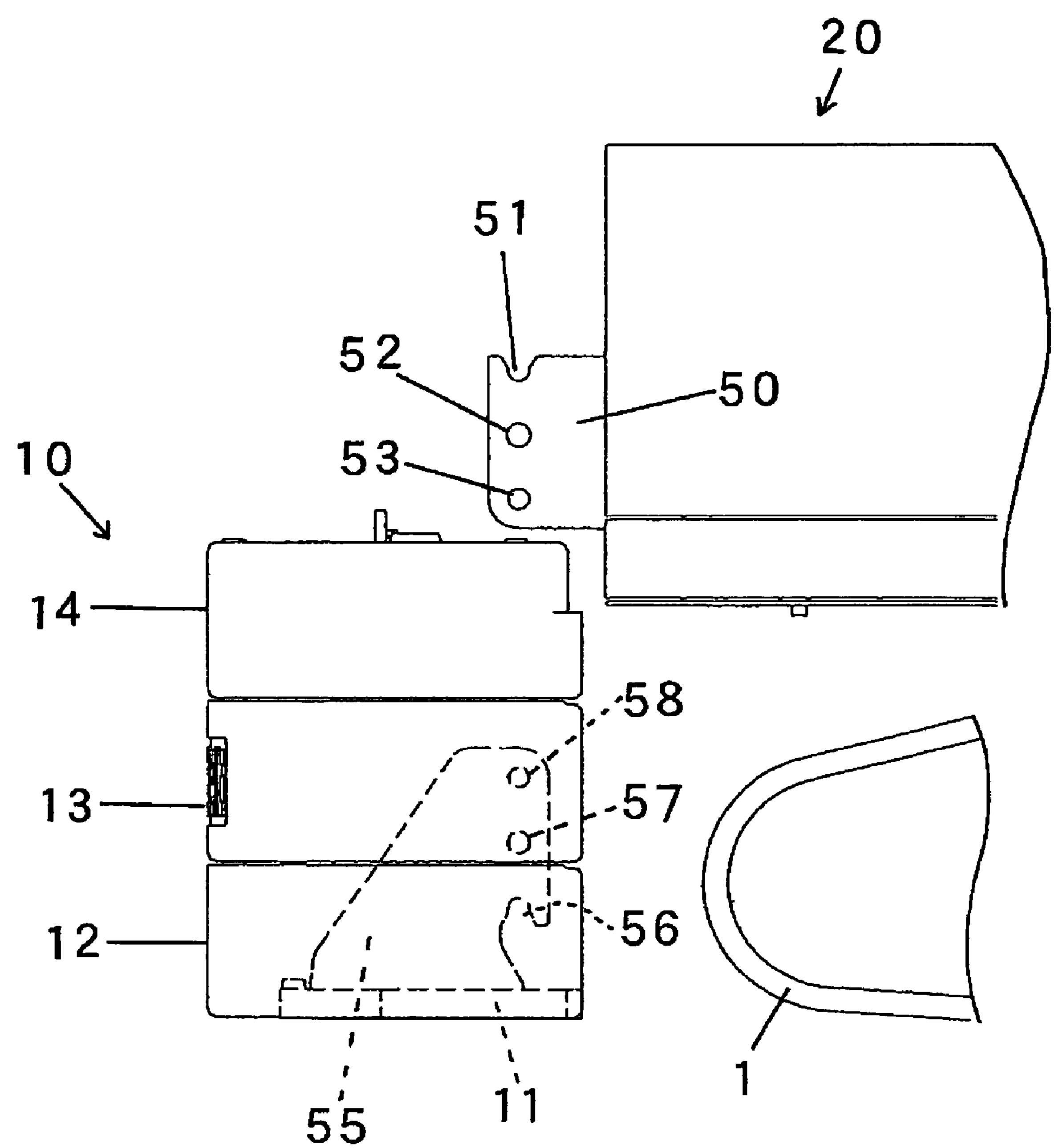
FIG. 9 shows a counterweight mounting procedure (1) executed with the counterweight device achieved in a second embodiment.
Figure 10:
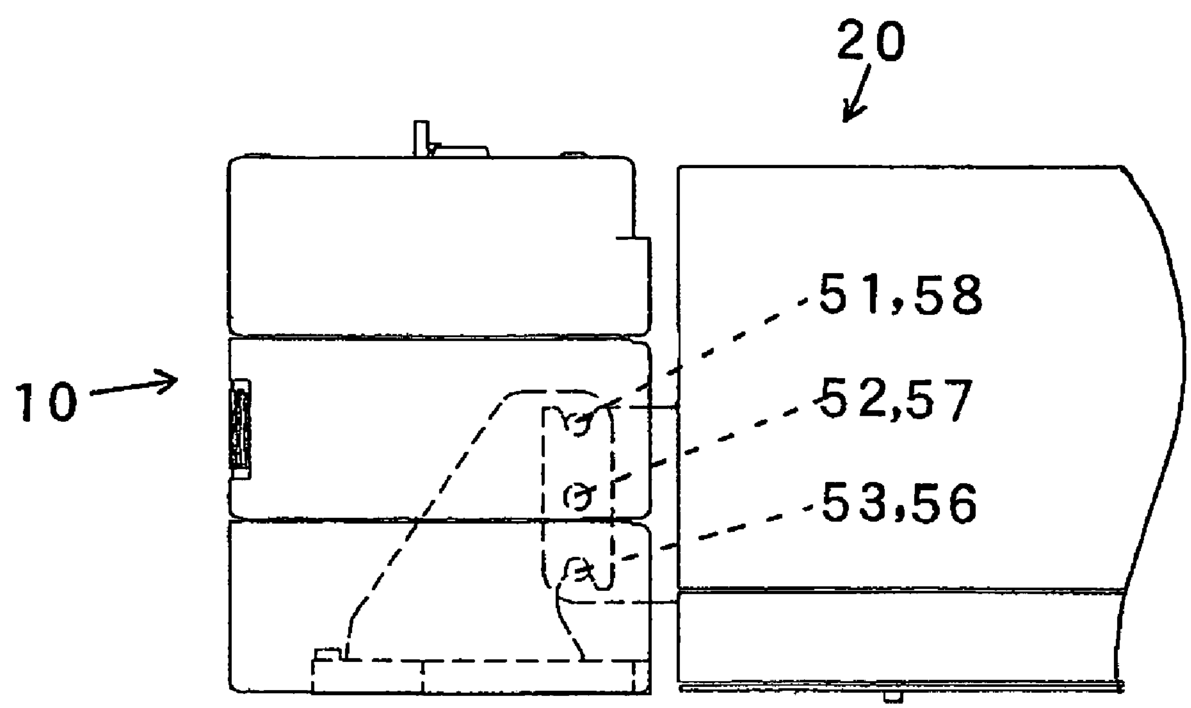
FIG. 10 shows a counterweight mounting procedure (2) executed with the counterweight device achieved in the second embodiment.
Figure 10:
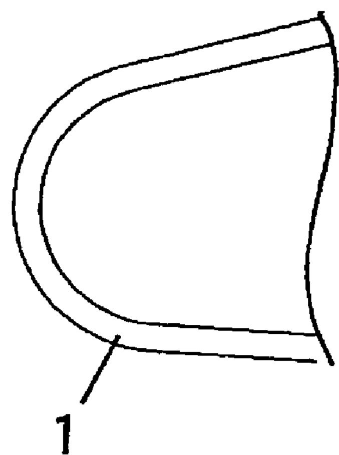
Figure 11:
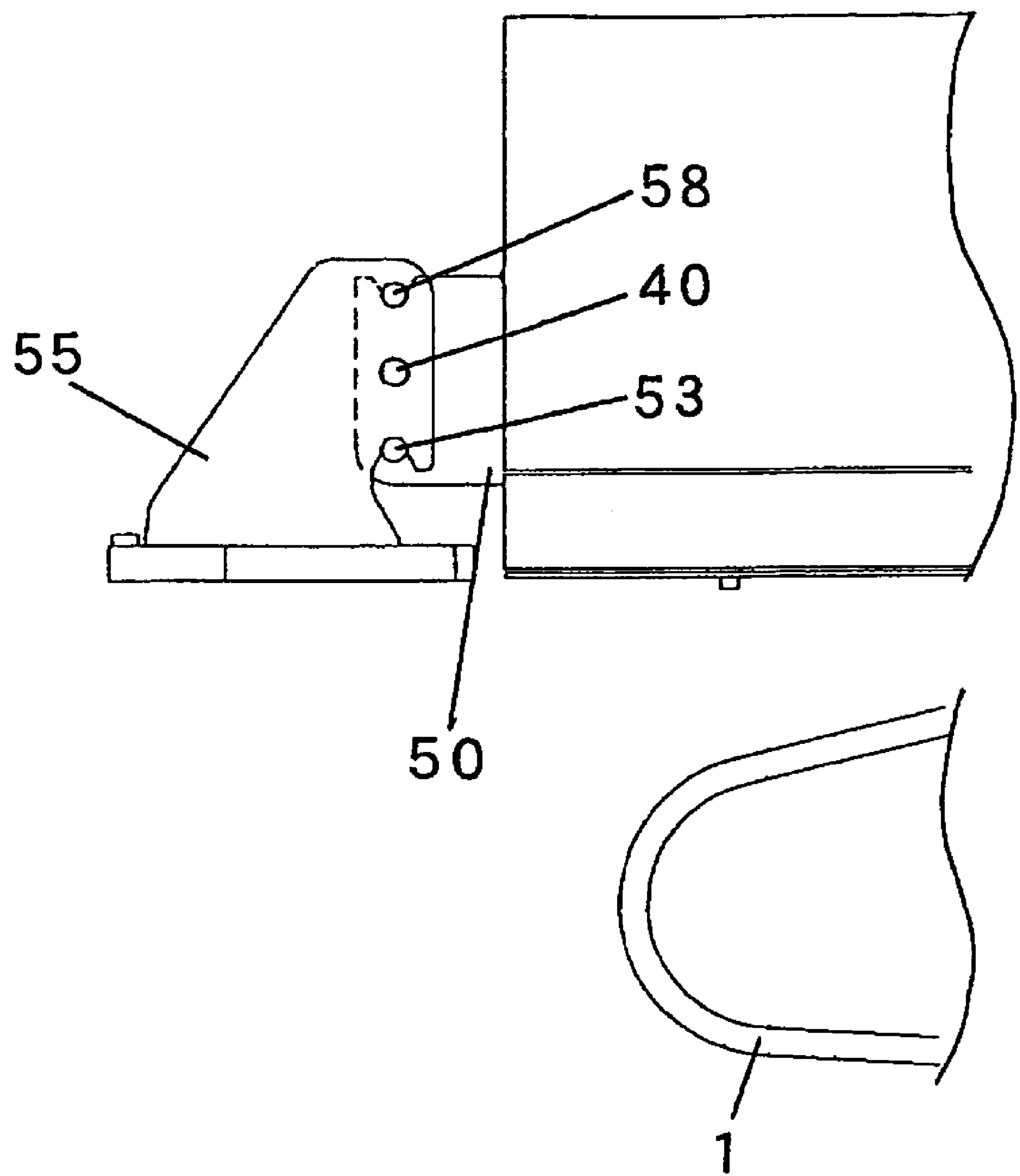
FIG. 11 shows a counterweight mounting procedure (3) executed with the counterweight device achieved in the second embodiment.

In reference to FIGS. 9 through 11, a second embodiment of the counterweight device according to the present invention is explained.

While the hydraulic cylinders 30 provided at the counterweight 10 enable self-actuated mounting/dismounting of the counterweight 10 in the first embodiment, the counterweight 10 is hoisted by a crane or the like and mounted onto the body frame 20 from above in the second embodiment instead of through the self-actuated mounting/dismounting method.

FIG. 9 is a side elevation showing the rear end of the body frame 20 and the counterweight 10 before the counterweight 10 is hoisted. The same reference numerals are assigned to components similar to those in FIG. 2 and the following explanation focuses on the differences. At the rear end of the body frame 20, a pair of brackets 50, i.e., a left bracket and a right bracket, are disposed, and a guide groove 51 recessed downward is formed at the upper end surface of each bracket 50. Under the guide groove 51, a pinhole 52 is formed and guide pins 53, one projecting to the left and the other projecting to the right along the horizontal direction, are disposed under the pinhole 52.

Support plates 55 are set upright at the upper surface of the base plate 11 on the inner side of, i.e., in the space enclosed by the U-shaped weights of the counterweight 10. A guide groove 56 recessed upward is formed at the front surface of the bottom portion of the support plate 55 in correspondence to the guide pin 53. Above the guide groove 56, a pinhole 57 is formed in correspondence to the pinhole 52, and above the pinhole 57, a guide pin 58 projecting along the horizontal direction is disposed in correspondence to the guide groove 51.

The counterweight 10 is mounted through the following procedure in the second embodiment. First, the counterweight 10 is hoisted up with a crane (not shown) and as the guide pins 58 and 53 become engaged at the engaging grooves 51 and 56 respectively, the counterweight 10 is slowly lowered. As a result, the mounting position of the counterweight 10 is corrected and the counterweight 10 is positioned relative to the body frame 20 as shown in FIG. 10. In this state, a pin 40 is inserted at the pinholes 52 and 57, as shown in FIG. 11 and the support plates 55 are locked onto the bracket 50. Through the procedure described above, which does not require a spacer or the like to be used to adjust the mounting attitude, the counterweight 10 can be mounted with ease, as in the first embodiment.

It is to be noted that the guide grooves 27 and 33 and the guide grooves 51 and 56 each recessed upward or downward are formed to facilitate the process of mounting/dismounting the counterweight 10 by moving the counterweight 10 along the vertical direction relative to the body frame 20 in the first and second embodiments described above, guide grooves formed to recess along directions other than these may instead be used. Namely, the shapes of the guide grooves 33 and 56 constituting first engaging grooves and the shapes of the guide grooves 27 and 51 constituting second engaging grooves are not limited to those described above. In addition, the guide pins 35 and 58 constituting first engaging members and the guide pins 29 and 53 constituting second engaging members, which correspond to the individual guide grooves, may take on shapes other than those described above. The brackets 26 and 50 and the support plates 32 and 55 at which the guide grooves and the guide pins are located, too, may adopt shapes other than those described above.

While the counterweight 10 is locked to the body frame 20 by inserting the pins 40 at the pinholes 28 and 34 after engaging the guide pins 35 and 29 at the guide grooves 27 and 33 and thus positioning the counterweight 10, a locking means other than the pins may be used. While the hydraulic cylinders 30 are used to raise/lower the counterweight 10 to mount/dismount the counterweight 10 through self actuation, another elevating means such as a winch disposed at a construction machine may be used instead.

Figure 12:
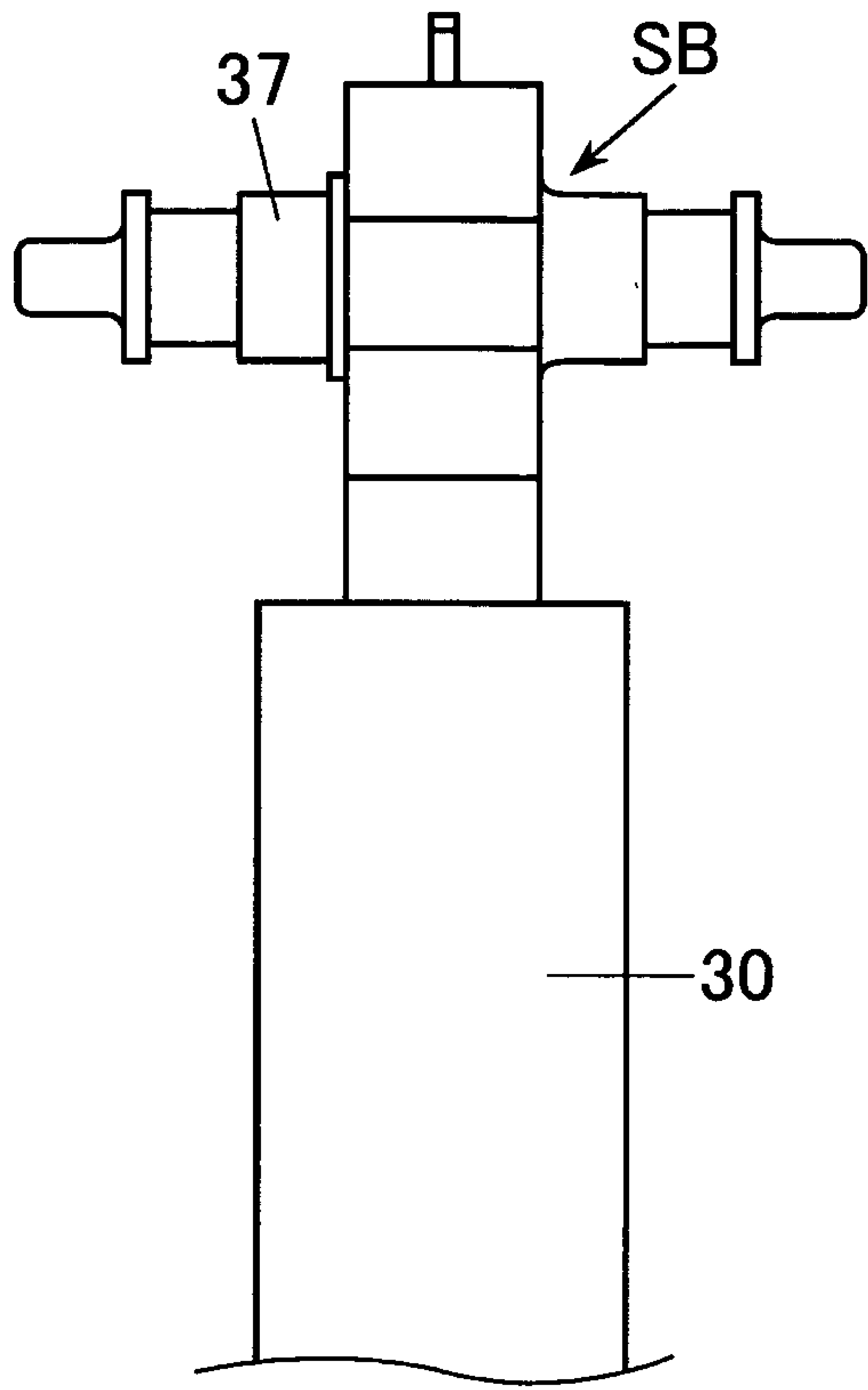
FIG. 12 is a partial view of a hydraulic cylinder with a rod pin being supported by a spherical bushing provided in a piston rod.

As shown in FIG. 12, aspherical bushing SB may be provided in the piston rod to support the rod pins 37 via the spherical bushing SB. By using the spherical bushing SB, it is possible to prevent the occurrence of partial contact between the rod pins 37 and the notches 25*a* which may cause an excessive force to act on them.

Figure 13:
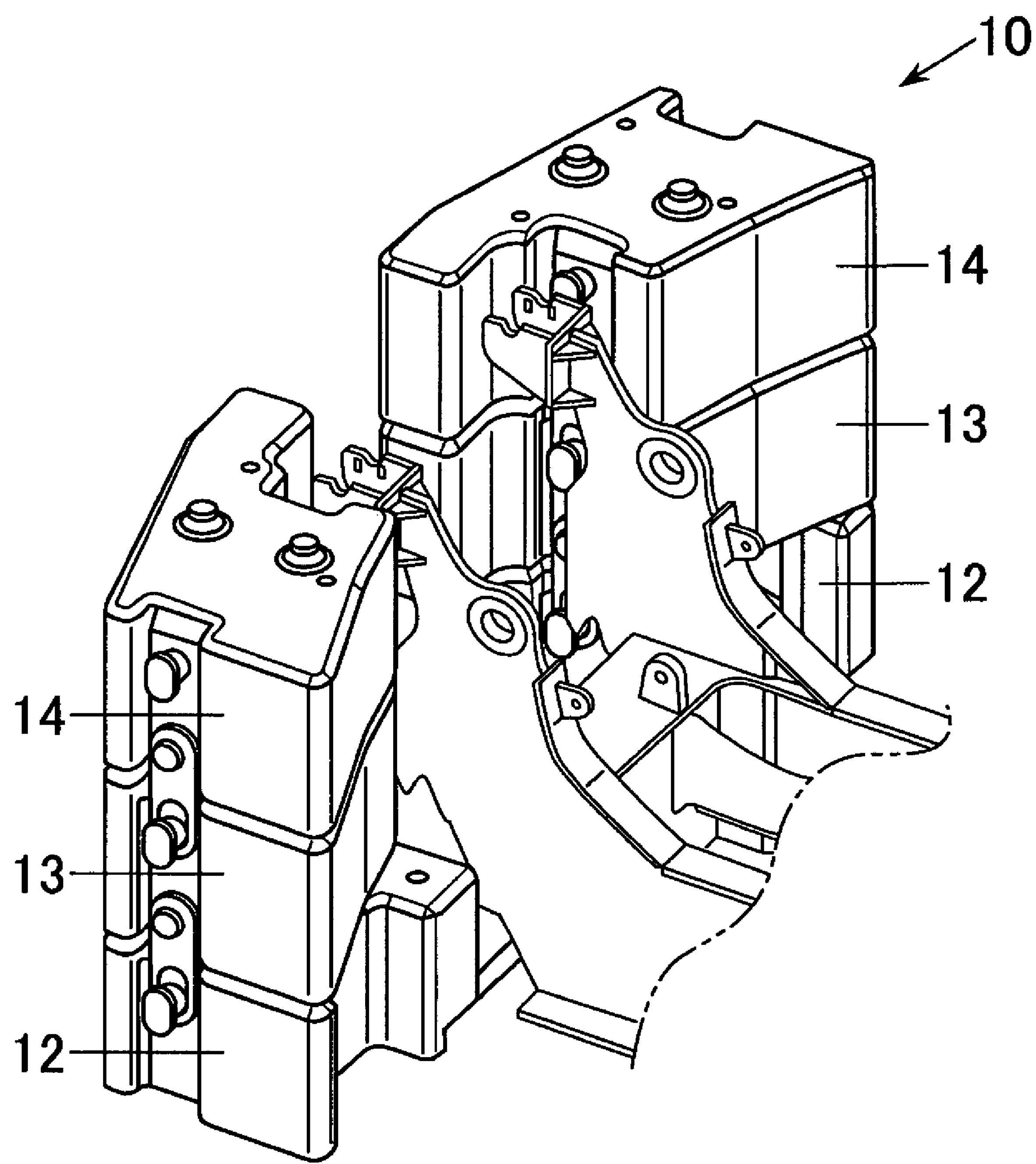
FIG. 13 shows another type of weights.

The shapes of the weights 12 to 14 of the counterweight 10 are not limited to those of shown in FIG. 3, and the weights 12 to 14 may each be divided into a plurality of parts, i.e., a left part and a right part, as shown in FIG. 13.

While the present invention is adopted in a crawler crane in the first and second embodiments described above, it may be adopted in another construction machine (e.g., a hydraulic excavator) having the counterweight 10 as well. Namely, as long as the features and functions of the present invention are realized, the counterweight device according to the present invention is not limited to the examples presented in the first and second embodiments.

As explained above, in the first and second embodiments of the present invention, the counterweight 10 is locked onto the body frame 20 by engaging a first engaging member disposed at the counterweight 10, e.g., the guide pin 35, at a second engaging groove formed at the body frame 20, e.g., the guide groove 27, and engaging a second engaging member disposed at the body frame 20, e.g., a guide pin 29, at a first engaging groove formed at the counterweight 10, e.g., a guide groove 33. Since this allows the mounting attitude of the counterweight 10 to be corrected with ease, the mounting procedure for mounting the counterweight 10 is facilitated.

The above described embodiments are examples, and various modifications can be made without departing from the spirit and scope of the invention.

What is claimed is:

1. A counterweight device for a construction machine, utilized to mount a counterweight at a body frame of the construction machine, comprising:

two pairs of support plates, with one pair of support plates disposed at a right region of the counterweight and another pair of support plates disposed at a left region of the counterweight;

two brackets provided on the body frame, each of which is insertable between the two pairs of support plates;

a first engaging groove formed at an upper end of each of the two pairs of supports plates;

a second engaging groove formed at a lower end of each of the two brackets;

a first engaging pin projecting from a lower part of each of the two pairs of support plates, that engages at the second engaging groove when mounting the counterweight;

a second engaging pin projecting from an upper part of each of the two brackets, that engages at the first engaging groove when mounting the counterweight;

a pinhole formed between the first engaging groove and the first engaging pin of each of the two pairs of support plates;

a pinhole formed between the second engaging groove and the second engaging pin of each of the two brackets;

two hydraulic cylinders provided on the counterweight so as to raise/lower the counterweight relative to the body frame;

a rod pin provided at an upper end of the piston rod of each of the two hydraulic cylinders;

two pairs of cylinder brackets provided on the body frame, that extend rearward with respect to the body frame, and a notch formed at an upper end of each of the two pairs of cylinder brackets at a position further rearward relative to a rear end of the body frame, that engages with the rod pin.

2. A counterweight device for a construction machine according to claim 1, wherein:

the first engaging grooves and the second engaging grooves are each formed so that a width of the groove becomes gradually smaller toward an innermost area of the groove relative to the width at an entry area thereof.

3. A counterweight device for a construction machine according to claim 1, wherein:

each of the hydraulic cylinders is a trunnion-mounted hydraulic cylinder at which a connecting unit for mounting the hydraulic cylinder at the counterweight is provided at side surface thereof.

4. A counterweight device for a construction machine according to claim 3, wherein:

the connecting unit is a pin projecting from a cylinder tube of the hydraulic cylinder, and the counterweight comprises a supporting member including a longitudinal hole for receiving the pin, that supports the hydraulic cylinder.

5. A counterweight device for a construction machines according to claim 3, wherein:

a mounting position at which each of the hydraulic cylinders is mounted at the counterweight is positioned above a position of the center of gravity of the counterweight.

6. The counterweight device for a construction machine according to claim 1, wherein each of the hydraulic cylinders is disposed between and is supported by one of the two pairs of support plates.

* * * * *